United States Patent [19]

Tsujii et al.

[11] Patent Number: 4,679,147
[45] Date of Patent: Jul. 7, 1987

[54] NAVIGATION SYSTEM WITH CAPABILITY OF INSTRUCTING RUNNING DIRECTION

[75] Inventors: Fumio Tsujii; Yoji Matsuoka, both of Mito; Takanori Shibata, Hitachi; Akira Endo, Mito; Hiroshi Shirai, Katsuta, all of Japan

[73] Assignee: Hitachi, Ltd., Tokyo, Japan

[21] Appl. No.: 715,259

[22] Filed: Mar. 25, 1985

[30] Foreign Application Priority Data

Mar. 28, 1984 [JP] Japan .................................. 59-58301

[51] Int. Cl.4 .............................................. G06F 15/50
[52] U.S. Cl. .................................... 364/449; 364/521; 340/988; 340/995; 73/178 R
[58] Field of Search ............... 364/424, 443, 449, 460, 364/521; 73/178 R; 343/451; 340/988, 990, 995; 342/451

[56] References Cited

U.S. PATENT DOCUMENTS 4,514,810 4/1985 Ito et al. ............................... 364/424
4,570,227 2/1986 Tachi et al. ........................... 340/990

Primary Examiner—Gary Chin
Attorney, Agent, or Firm—Antonelli, Terry & Wands

[57] ABSTRACT

A navigation system for displaying, on a display screen, road map information and running traces of a car superimposed thereon comprises a cathode ray tube for displaying the road map information and information regarding the car running traces and the like, bearing sensors for detecting a running direction of the car, a detector for detecting a running distance of the car by detecting a revolution of the car wheel, and a controller receiving outputs from the bearing sensors and the running distance detector, for computing a current position of the car and selecting road map information corresponding to the current position for display thereof on the cathode ray tube. The controller sets specified circular areas centered on respective crossings on the road map information, detects arrival of the car at an entrance to a specified area, determines an angular difference between an approaching running direction of the car and a destination bearing at the entrance, and gives, on the basis of the determined angular difference, a voice instruction for running of the car at the crossing to the driver.

7 Claims, 6 Drawing Figures

NAVIGATION SYSTEM WITH CAPABILITY OF INSTRUCTING RUNNING DIRECTION

This invention relates to a navigator in which road map information is displayed on a cathode ray tube (hereinafter referred to as CRT) and running trace in the direction of movement of an automobile are displayed while being superimposed on the road map information.

Such a navigator is useful to facilitate easy running of an automobile toward a destination even when the automobile is traveling in an area with which the driver is unfamiliar.

In the past, a navigation system has been known in which road map information is displayed on a CRT, and as an automobile runs, computation data, indicative of a running trace of the movement of the automobile, as computed by a microcomputer on the basis of data from a bearing sensor for inputting the running bearings of the automobile to the system and from a car speed pulse sensor, is displayed by being superimposed on the road map information. This navigation system can however display only the results of running when the automobile is practically driven. Accordingly, in order to correctly reach a destination in an area with which the driver is unfamiliar, the driver must constantly be acquainted with the direction of the destination and especially, a judgement as to whether the automobile should run straight forwardly, turn to the left or turn to the right at crossings is left up to the driver. For these reasons, the navigation system is less effective to serve as a navigator. Another navigator intended to cope with these drawbacks has been disclosed, for example, in Japanese patent application Laid-open No. 26214/1983 entitled "Running Information System". According to this latter navigator, voice instructions are issued to indicate a straight-forward, turn-to-the right or turn-to-the left running at crossings, and the driver can advantageously be instructed by this information. To perfect the above operation, prior to driving, the driver must key-in or input to the system turn-to-the left, turn-to-the right and straightforward running instructions in respect of all the crossings on a road map by using a keyboard. This preparatory operation, however, becomes extensive in proportion to an increase in the distance to a destination, and imposes a great labor on the driver and hence is time consuming.

This invention therefore contemplates elimination of the above prior art drawbacks and has for its object to provide a navigation system which is capable of issuing voice instructions which apprize the driver of car running directions at crossings through a preparatory operation carried out within a reduced time.

According to this invention, the above object can be accomplished by a navigation system wherein for detection of crossings on a road map, a specified circular area centered on each of the crossings is set, and when a car reaches a particular circular area associated with a particular crossing, a running direction at that crossing is automatically determined by computing a destination bearing and a running direction of the car when it approaches that area (hereinafter simply referred to as approaching running direction), thereby simplifying the key-in operation prior to driving. Thus, the invention is featured by means for setting specified circular areas centered on respective crossings on road map information and detecting a car which reaches a particular specified circular area, computing means for computing an angular difference between an approaching running direction and a destination bearing at an entrance to the particular circular area, and running direction instructing means responsive to computation results for issuing voice instructions which apprize the driver of a running direction of the car at a crossing associated with the particular area.

The present invention will be apparent from the following detailed description taken in conjunction with the accompanying drawings, in which.

Figure 1:
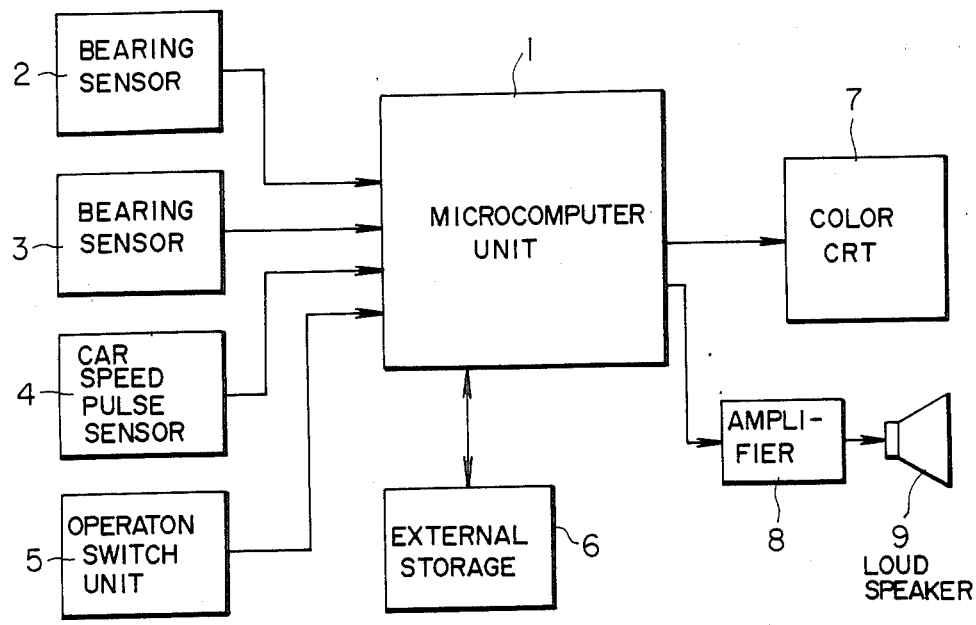
FIG. 1 is a block diagram schematically showing the overall construction of a navigation system according to an embodiment of the invention.

Referring to FIG. 1 illustrating the overall construction of a navigation system according to an embodiment of the invention, there is seen a microcomputer unit 1 which is the heart of the present navigation system and which controls the operation of the entire system. Details of the microcomputer unit 1 will be described later with reference to FIG. 3.

A bearing sensor 2 for detecting an absolute bearing of a car running direction utilizes earth magnetism and provides amplified analog quantities representative of its X and Y components.

Like the bearing sensor 2, a bearing sensor 3, for example, in the form of an optical fiber sensor detects a car running direction but provides an output representative of a relative bearing.

A car speed pulse sensor 4 generates an ON-OFF pulse corresponding to a car speed which in turn is inputted, as a signal representative of a running distance of the car, to the microcomputer unit 1 of the navigation system.

An operation switch unit 5 is adapted for inputting various running conditions of the car to the microcomputer unit 1 and includes a plurality of switches which are used for inputting to the various running conditions as a digital signal.

An external storage 6 stores road map information and various running conditions and takes the form of, for example, a cassette tape controlled by the microcomputer unit 1.

A color CRT 7 serving as a means for displaying the road map information and the like stored in the external storage 6 is controlled by an output of a color CRT control circuit included in the microomputer unit 1.

An amplifier 8 amplifies a voice signal and cooperates with a loudspeaker 9 to provide voice instructions which apprize the driver of the running information.

Figure 2:
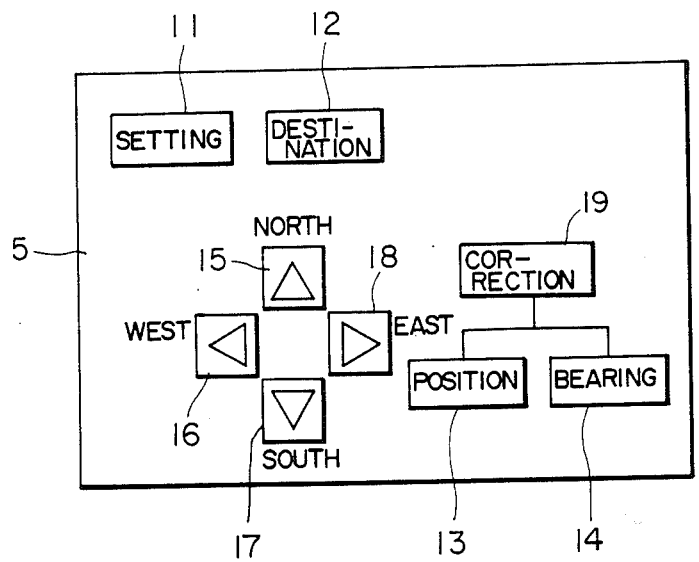
FIG. 2 shows a layout of individual switches on an operation panel.

The operation switch unit 5 shown in FIG. 1 includes a plurality of operation switches as shown in FIG. 2. A setting switch 11 is adapted to set a running start point and a running destination during initialization of the navigation system. A switch 12 cooperative with the setting switch 11 is operated so as to set the running destination of the car. A position switch 13 cooperative with a correction switch 19 is adapted to correct a current position of the car. A bearing switch 14 also cooperative with the correction switch 19 is adapted to correct the bearing sensors 2 and 3 adapted to detect the running direction of the car. A group of switches 15 to 18 are used to set and move cursors which indicate a current position of the car displayed on the color CRT 7. The cursors can be moved in any directions labelled to the respective switches 15 to 18. For example, when the switch 15 labelled with north is pushed down, a first cursor (a cursor line extending to an X-axis) is moved from the current position to the north. With depression of the switches 16, 17 and 18, a second cursor (a cursor line extending to a Y-axis) is moved to the west, the first cursor to the south and the second cursor to the east, respectively.

Figure 3:
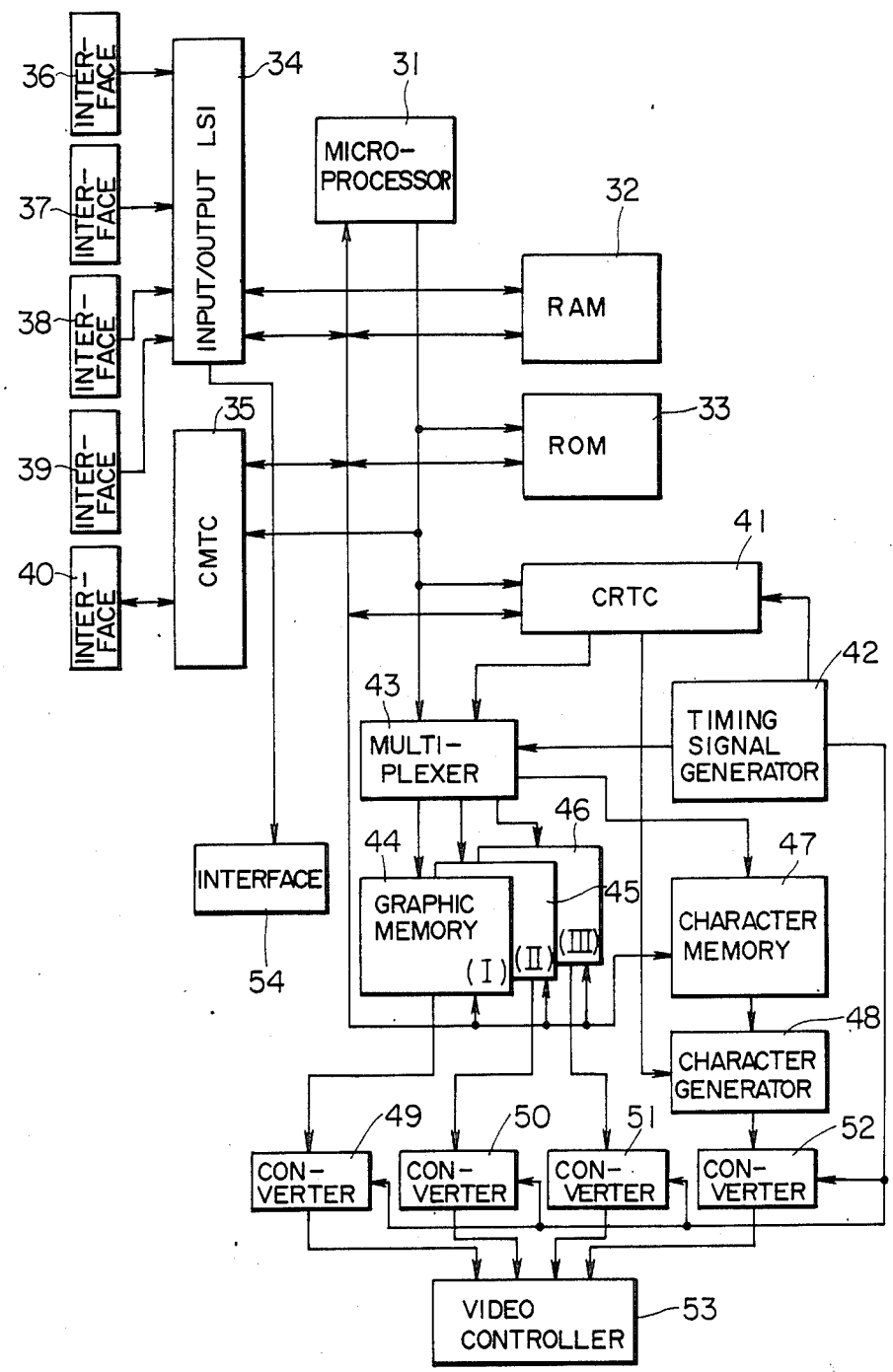
FIG. 3 is a block diagram showing details of a microcomputer used in FIG. 1.

Details of the microcomputer unit 1 shown in FIG. 1 are illustrated in FIG. 3. A microprocessor 31 is the heart of the microcomputer unit 1 and controls the operation thereof. A RAM (volatile memory) 32 is used for temporary storage of data in the course of the computation and control operation by the microprocessor 1. A battery carried on the car and independent of a system power supply feeds the RAM 32 and contents stored therein are kept alive even when the system power is turned off.

A ROM (non-volatile memory) 33 stores programs necessary for various control operations and computation operations by the microprocessor 1. An input/output control LSI (large scale integrated circuit) 34 is adapted to input various data from interfaces 36 to 39 to the microprocessor 1. The interfaces 36 to 39 are for level conversion and waveform shaping of signals. The bearing sensor 2 is connected to the interface 36, the bearing sensor 3 to the interface 37, the car speed pulse sensor 4 to the interface 38, and the operation switch unit 5 to the interface 39. A control LSI for small magnetic tape device (hereinafter referred to as CMTC) 35 controls input/output of control signals and data (such as road map information and various running conditions) occurring between the external storage 6 in the form of the small magnetic tape device and the microprocessor 31. An interface 40 effects signal processing necessary for steady transmission/reception of signals between the CMTC 35 and the small magnetic tape device.

An LSI 41 which is the heart of a circuit for transmission of various display data to the color CRT 7 controls all contents of the display data. The LSI 41 is simply referred to as CRTC 41.

A timing signal generator 42 generates a reference clock signal to the CRTC 41, a clock signal in the form of a serial signal to be transmitted to a video controller, and a timing signal which controls gating (open or close) of a multiplexer 43.

The multiplexer 43 is responsive to the timing signal of the timing signal generator 42 to switch a address signal from the microprocessor 31 and an address signal from the CRTC 41.

Graphic memories 44 to 46 for data of primary colors, red, blue and green, to be displayed on the color CRT 7 are accessible, through the multiplexer 43, to the microprocessor 31 and the CRTC 41 for reading and writing, thus combining the three primary colors to provide display of 8 kinds of graded color data.

A character memory 47 dedicated to storage of character information to be displayed on the color CRT 7 is also accessible, through the multiplexer 43, to the microprocessor 31 and CRTC 41 for reading and writing.

A character generator 48 stores patterned information of characters such as alphabetical letters, numerals, symbols or Katakana letters and responds to outputs of the CRTC 41 and character memory 47 to select and deliver one of various character patterns stored. Converters 49 to 52 operate in synchronism with the timing signal generated from the timing signal generator 42 to convert parallel data outputted from the graphic memories 44 to 46 and character generator 48 into serial data.

The video controller 53 effects level conversion and waveform shape processing of outputs from the parallel to serial data converters 49 to 52 so that these outputs meet a specification required for the color CRT 7. For data transmission, the video controller 53 is connected to the color CRT 7.

An interface 54 aids in the transmission of voice data to the loudspeaker 9 via the amplifier 8.

The operation of the navigation system having the construction described above will be described.

Figure 4:
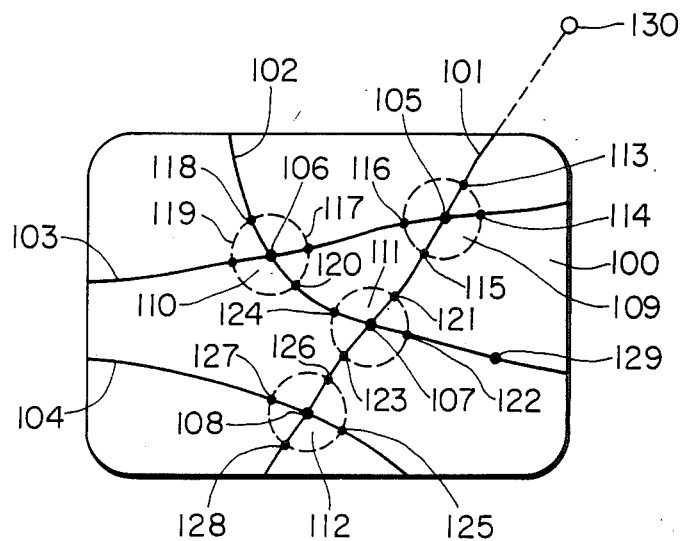
FIG. 4 shows an example of a display of road map information which is useful for explaining the principle of the invention.
Figure 5:
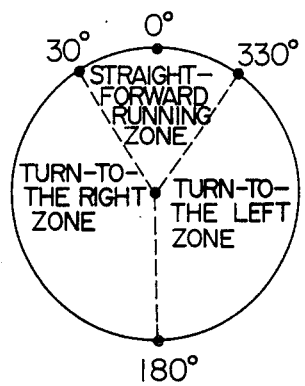
FIG. 5 shows running zones defined by referencing to a destination bearing.

An example of road map information displayed on a color CRT screen 100 as shown in FIG. 4 is useful to explain the principle of the present invention. Also shown in FIG. 5 are running zones about a crossing which are selected in accordance with an angular difference between an approaching running direction and a destination bearing of the car which is measured counterclockwise with respect to 0° reference of the destination bearing.

In FIG. 4, displayed on the screen 100 of the color CRT 7 are roads 101 to 104, crossings 105 to 108 of the roads on a road map, circular areas 109 to 112 centered on the crossings, intersections 113 to 128 on the boundary of the respective circular areas 109 to 112 and the respective roads, a running start point 129, and a destination 130. The destination 130 is outside the color CRT screen 100, indicating that this destination is far away.

When the ignition switch is turned on, the FIG. 3 system inclusive of the microprocessor 31 is started and initialized in accordance with an initializing program stored in the ROM 33. As a result, the system is ready for receiving commands issued by operating the switches on the operation switch unit 5. Under this condition, a desired one or ones of the switches 15 to 18 are operated to issue signals which, after being subjected to waveform shaping by the interface 39, are fetched by the microprocessor 31 via the input/output LSI 34. Pursuant to block codes dividing the whole country of Japan, the signals issued from the switches 15 to 18 after initilization are respectively used to increase the column number, to decrease the row number, to decrease the column number, and to increase the row number. The microprocessor 31 then sends to the CMTC 35 an instruction calling for road map information selected by the setting of the switches 15 to 18, and this call instruction is sent to the external storage 6 via the interface 40. Based on this instruction, the road map information is read from the external storage 6 and written into the graphic memories 44 to 46 via the interface 40 and CMTC 35 under the control of the microprocessor 31. Data of the graphic memories 44 to 46 is sent to the data converter 49 to 51 under the control of the CRTC 41 and is subjected to parallel to series conversion at the timing of the timing signal generated from the timing signal generator 42. The thus obtained serial data is sent to the color CRT 7 via the video controller 53.

The driver then operates the switches 15 to 18 to move the first and second cursors on the displayed road map information, thereby setting the cursor intersection on a running start position. Thereafter, with the setting switch 11 operated, the running start point 129 shown in FIG. 4 is written into a particular address of the RAM 32 via the interface 39 and input/output LSI 34 under the control of the microprocessor 31.

Subsequently, road map information containing the destination 130 shown in FIG. 4 is displayed on the screen of the color CRT 7 in a similar manner that the running start point is set and thereafter, the driver operates the switches 15 to 18 to set the intersection of the cursors at the destination 130. At this time, the destination setting switch 12 is operated so that data for the destination 130 is written into a particular address of the RAM 32 under the control of the microprocessor 31. After the running start point and destination have been fetched by the system, the microprocessor 31 computes distances in terms of X and Y coordinates between the running start point 129 and the destination 130 as well as a bearing of a straight line connecting the running start point 129 to the destination 130. Thereafter, the distances and the destination bearing are stored into a particular address of the RAM 32.

After completion of the above operations, as the car starts to run, as shown in FIG. 4, from the running start point 129 to the destination 130 along the road 102, signals from the bearing sensors 2 and 3 undergo waveform shaping at the interfaces 36 and 37 in accordance with a period of a pulse from the car speed pulse sensor 4 and are sent via the input/output LSI 34 to the microprocessor 31 where they are computed to determine a bearing data which in turn is stored in a particular address of the RAM 32. A running distance is determined by counting and computing for a predetermined time the number of transmissions of the signal from the car speed pulse sensor 4 to the microprocessor 31 via the interface 38 and input/output LSI 34. A result of computation is stored in a particular address of the RAM 32.

The microprocessor 31 computes a running trace on the basis of the bearing data and running distance data, an the computation result is written in the graphic memories 44 to 46. Running trace data written in the graphic memories is displayed on the color CRT 7 in the same manner as the road map information. When preparing the road map, the circular areas 109 to 112 shown in FIG. 4 are specifically set as white data, i.e., data being not displayed on the display screen to provide an area of a radius of 50 m centered on each of the crossings 105 to 108. When the car running from the running start point 129 to the crossing 107 along the road 102 reaches the intersection 122 on the boundary of circular area 111 and the road 102, the microprocessor 31 computes an approaching running direction or bearing of the car based on outputs of the bearing sensors 2 and 3, and a destination bearing of the destination 130 as viewed from the intersection 122.

Figure 6:
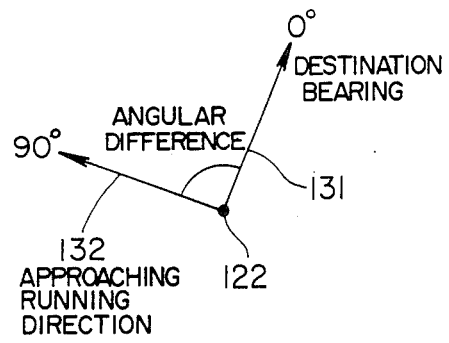
FIG. 6 is a diagram for explaining an example of computation for the destination bearing and a running bearing.

To explain results of the above computation, the destination bearing is taken as a reference of 0° as shown in FIG. 6. Since, in FIG. 6, the destination bearing as viewed from the intersection 122 is denoted by 131 and the approaching running direction of the car at the intersection 122 is denoted by 132, the angular difference between the destination bearing 131 and the approaching running direction 132 is 90° in this example.

Three zones are principally defined with respect to the destination bearing of 0° as shown in FIG. 5. More specifically, a straightward running zone is defined by the angular difference between the destination bearing 131 and approaching running direction 132 which is less than 30° and larger than 330°, a turn-to-the right running zone is defined by the angular difference which is larger than 31° and is not greater than 180°, and a turn-to-the left running zone is defined by the angular difference which is larger than 180° and is not greater than 330°. Referring to FIGS. 5 and 6, since the angular difference between the destination bearing 131 and approaching running direction 132 at the intersection 122 is 90° in this example, this angular difference is applied to the FIG. 5 zone classification to determine the turn-to-the right running zone. When the computation is effected to select one of the zones shown in FIG. 5, the microprocessor 31 selects a code representative of the determined zone from codes representative of straightforward, turn-to-the right and turn-to-the left runnings which are stored in the ROM 33, and sends the selected code via the input/output LSI 34 and interface 54 to the amplifier 8, so that the loudspeaker 9 apprizes the driver of a voice instruction corresponding to the selected code. In this example, the angular difference between the destination bearing and approaching running direction falls within the turn-to-the right zone and hence the driver is apprized of a voice instruction "please turn to the right". Under this condition, the driver turns the car to the right at the crossing 107 and causes the car to enter the road 101. Since in this embodiment the approaching running direction and destination bearing are systematically computed when the car reaches the entrance to the circular area, no computation is effected at the intersection 121, i.e., exit from the circular area and the next computation and comparison will be effected in respect of a destination bearing and an approaching running direction at the intersection 115. At the intersection 115, the angular difference between the approaching running direction and destination bearing approximates 0°, and the driver is apprized of a voice instruction "Please go straight ahead" from the loudspeaker 9.

As described above, the navigation system according to the present invention is advantageous in that, since the guiding function gives a voice instruction for running at a crossing to the driver 50 m before the crossing on the road map information, the burden imposed on the driver can be reduced considerably, and since the preparatory operation necessary for the above operation can be completed by setting only a destination without requiring sophisticated key switch operations, the driver can be freed from considerable labor and time for the preparatory operation, and labor and time required for the driver to operate key switches can be fixed and minimized irrespective of the distance to the destination.

What is claimed is:

1. A navigation system for displaying, on a display screen, road map information and a running trace of a car superimposed thereon comprising:

display means including a cathode ray tube for displaying road map information and information regarding the car running trace;

at least one bearing sensor means for detecting the running direction of the car;

running distance detector means for detecting the running distance of the car; and control means, connected to receive output signals from said bearing sensor means and said running distance detector means, for computing a current position of the car, for controlling car running information. such as the road map information, a running trace and a running bearing corresponding to the current position of the car, and for displaying the car running information on said cathode ray tube, said control means including:
(a) external storage means for storing the road map information and the car running information;
(b) a central control unit for controlling said external storage means, said computation of the current position of the car and said display of the road map information; and
(c) means for instructing the driver as to the desired running direction; and wherein:

said central control unit comprises means for setting specified areas centered on respective crossings of roads on said road map information stored in said external storage means, means for calculating a running position of the car in accordance with the output signals of said bearing sensor means and said running distance detector means, means for detecting the arrival of the car at an entrance of the specified area by comparing the calculated value of the running position with data indicating the boundary of the specified area, means for determining the angular difference between the current running direction of the car and a destination bearing at the entrance of the specified area in accordance with the output signal of said bearing sensor means at said entrance and information of the destination bearing stored in said external storage means, and means for controlling said running direction instructing means to indicate to the driver the desired running direction at a crossing in accordance with said determined angular difference.

2. A navigation system according to claim 1, wherein said running direction instructing means provides a voice instruction to the driver.

3. A navigation system according to claim 2, wherein said running direction instructing means comprises a loudspeaker for issuing a voice instruction.

4. A navigation system according to claim 1, wherein said means for determining the angular difference between the current running direction of the car and the destination bearing referenced to the destination controls said running direction instructing means to indicate a straightforward running when the angular difference falls within ± 30°.

5. A navigation system according to claim 4, wherein said running direction instructing means is controlled to indicate a turn-to-the left running when the angular difference falls within a range of from 30° to 180°, and said running direction instructing means is controlled to indicate a turn-to-the right running when the angular difference falls within a range of from 180° to 330°.

6. A navigation system according to claim 1, wherein said specified area is centered on said crossing and has its boundary spaced a predetermined distance from said crossing, the data defining said area by the boundary being stored in said external storage means.

7. A navigation system according to claim 6, wherein the boundary of said specified area is spaced by 50 m from said crossing.

* * * * *